(12) United States Patent
Fukui et al.

(10) Patent No.: US 7,602,943 B2
(45) Date of Patent: Oct. 13, 2009

(54) IMAGE PROCESSING APPARATUS, IMAGE PROCESSING METHOD, AND IMAGE PROCESSING PROGRAM

(75) Inventors: Motofumi Fukui, Kanagawa (JP); Noriji Kato, Kanagawa (JP); Hirotsugu Kashimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 672 days.

(21) Appl. No.: 11/338,807

(22) Filed: Jan. 25, 2006

(65) Prior Publication Data

US 2006/0279800 A1     Dec. 14, 2006

(30) Foreign Application Priority Data

Jun. 14, 2005   (JP) .............................. 2005-174409

(51) Int. Cl.
*G06K 9/00* (2006.01)
(52) U.S. Cl. ...................... 382/103; 382/181
(58) Field of Classification Search ............... 382/103, 382/181
See application file for complete search history.

(56) References Cited

U.S. PATENT DOCUMENTS 6,363,160 B1* 3/2002 Bradski et al. .............. 382/103

OTHER PUBLICATIONS

Gary R. Bradski et al., "Computer Vision Face Tracking For Use in a Perceptual User Interface" *Intel Technology Journal Q2*, pp. 1-15, 1998.

* cited by examiner

*Primary Examiner*—Tom Y Lu
(74) *Attorney, Agent, or Firm*—Oliff & Berridge, PLC

(57) ABSTRACT

An image processing apparatus includes a map generation unit, a temporary area arrangement unit and a target area detection unit. The map generation unit acquires a map of scores in which each score pertaining to a degree—to which a corresponding unit area of image data is likely to be contained in a target area—is associated with a position of the corresponding unit area. The temporary area arrangement unit arranges a temporary area in a position determined in accordance with a predetermined condition, on the map of scores. The target area detection unit performs, at least once, at least one of: (1) processing of changing the position of the temporary area on the map of scores, and (2) processing of changing a ratio of a length of the temporary area in a predetermined direction to that of the temporary area in an orthogonal direction.

9 Claims, 5 Drawing Sheets

IMAGE PROCESSING APPARATUS, IMAGE PROCESSING METHOD, AND IMAGE PROCESSING PROGRAM

The entire disclosure of Japanese Patent Application No. 2005-174409 including the specification, claims, drawings and abstract is incorporated herein by reference in its entirety.

BACKGROUND OF THE INVENTION

1. Field of the Invention

The invention relates to an image processing apparatus, an image processing method, and an image processing program for detecting an area including at least a portion of an object, such as a person, included in image data.

2. Description of the Related Art

Detecting a portion, such as a human face or hands, from image data is an extremely important technique for ascertaining the posture or state of a person. The face or hands can be detected by means of a technique for acquiring, by any method, information about the skin color of the face or hands to be detected as a color distribution, to thus define an image area including the face or hands using the color distribution.

When, e.g., a hand area, is detected using the technique, a score value pertaining to a degree to which the hand area is included in image data is computed for each of pixels included in the image data on the basis of a color distribution of acquired skin color, thereby generating a map of scores in which positions of the respective pixels and scores are associated with each other. A hand area is detected using this map of scores.

A CAMSHIFT(Continuously Adaptive Mean Shift) algorithm is available as one technique for detecting an target area such as a hand area through use of a map of scores (see "Computer Vision Face Tracking For Use in a Perceptual User Interface" (Gary R. Bradski, et al., Intel Technology Journal Q2, (1998)). When this technique is adopted, a temporary area is first set on the map of scores. The position of the temporary area is shifted on the basis of the distribution of scores of the temporary area, and processing for changing the size of the temporary area is repeated, thereby determining a target area from a position on which the temporary area converges and the size of the temporary area.

However, according to the related-art technique, during detection of the target area, the position and size of the temporary area are changed in accordance with the distribution of scores in the temporary area. However, the shape of the temporary area is changed solely on the basis of the distribution of scores pertaining to an overall area which assumes the same shape as that of the temporary area and includes the temporary area. For this reason, the size of the temporary area is not changed on the basis of information about another area adjacent to the temporary area in a predetermined direction. Consequently, when the shape of an target area to be defined cannot be predicted in advance, there arise problems, such as a failure to detect the target area, or deterioration of detection accuracy. In the case of detection of, e.g., hand areas, when the photographed person is wearing a jacket with long sleeves and when the only skin exposed is that on the hands, the hand areas can be detected with comparatively-superior accuracy through use of skin color information. However, when the photographed person is wearing a jacket with short sleeves and skin of the entire arms is exposed, there may arise a case where correct detection of the hand areas ends in failure.

The present invention has been conceived under the circumstances, and provides an image processing apparatus, an image processing method, and an image processing program, which can improve detection accuracy in the case of detecting an area including at least a portion of an object, such as a person, included in image data.

SUMMARY OF THE INVENTION

According to an aspect of the invention, an image processing apparatus detects a target area including at least a portion of an object from image data generated by capturing at least the portion of the object. The apparatus includes a map generation unit, a temporary area arrangement unit and a target area detection unit. The map generation unit acquires a map of scores in which each score pertaining to a degree—to which a corresponding unit area of the image data is likely to be contained in the target area—is associated with a position of the corresponding unit area in the image data. The temporary area arrangement unit arranges a temporary area of a predetermined shape in a position on the map of scores. The position is determined in accordance with a predetermined condition. The target area detection unit performs, at least once, at least one of:

(1) processing of changing the position of the temporary area on the map of scores, on a basis of a distribution of scores of unit areas included in the temporary area, and (2) processing of changing a ratio of a length of the temporary area in a predetermined direction to a length of the temporary area in a direction orthogonal to the predetermined direction, on a basis of positions and scores of unit areas included in a predetermined adjacent area adjacent to the temporary area.

The target area determination unit determines the temporary area as the target area when another predetermined condition is met. The target area determination unit outputs the determined target area.

According to another aspect of the invention, an image processing method detects, using a computer, a target area including at least a portion of an object from image data generated by capturing at least the portion of the object. The method includes: acquiring a map of scores in which each score pertaining to a degree—to which a corresponding unit area of the image data is likely to be contained in the target area—is associated with a position of the corresponding unit area in the image data; arranging a temporary area of a predetermined shape in a position on the map of scores, the position being determined in accordance with a predetermined condition; performing, at least once, at least one of:

(1) processing of changing the position of the temporary area on the map of scores, on a basis of a distribution of scores of unit areas included in the temporary area, and (2) processing of changing a ratio of a length of the temporary area in a predetermined direction to a length of the temporary area in a direction orthogonal to the predetermined direction, on a basis of positions and scores of unit areas included in a predetermined adjacent area adjacent to the temporary area;

determining the temporary area as the target area when another predetermined condition is met; and outputting the determined target area.

According to still another aspect of the invention, a storage medium is readable by a computer. The storage medium stores a image processing program of instructions executable by the computer to perform a function for detecting a target area including at least a portion of an object from image data generated by capturing at least the portion of the object. The function includes: acquiring a map of scores in which each score pertaining to a degree—to which a corresponding unit area of the image data is likely to be contained in the target area—is associated with a position of the corresponding unit area in the image data; arranging a temporary area of a predetermined shape in a position on the map of scores, the position being determined in accordance with a predetermined condition; performing, at least once, at least one of:
- (1) processing of changing the position of the temporary area on the map of scores, on a basis of a distribution of scores of unit areas included in the temporary area, and
- (2) processing of changing a ratio of a length of the temporary area in a predetermined direction to a length of the temporary area in a direction orthogonal to the predetermined direction, on a basis of positions and scores of unit areas included in a predetermined adjacent area adjacent to the temporary area;

determining the temporary area as the target area when another predetermined condition is met; and outputting the determined target area.

According to the above-described configurations, even when the shape of an area to be detected cannot be ascertained in advance during detection of an area containing at least a part of an object, such as a person or the like, included in image data, the accuracy of detection can be enhanced.

DETAILED DESCRIPTION OF EMBODIMENTS OF THE INVENTION

Embodiments of the invention will be described hereinbelow by reference to the drawings.

Figure 1:
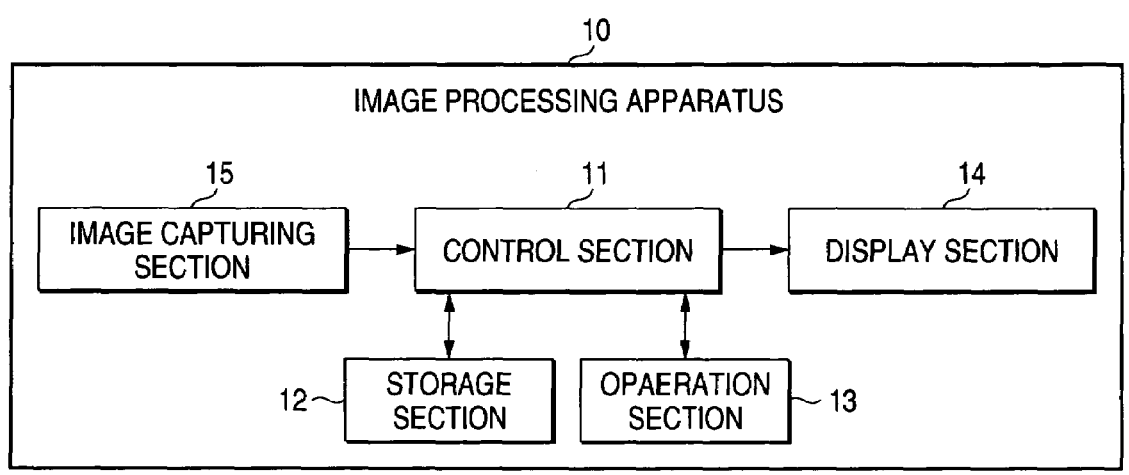
FIG. 1 is a block diagram showing the configuration of an image processing apparatus according to an embodiment of the present invention.

As shown in FIG. 1, an image processing apparatus 10 according to an embodiment of the present invention comprises a control section 11, a storage section 12, an operation section 13, a display section 14, and an image-capturing section 15.

The control section 11 is formed from, e.g., a CPU or the like, and operates in accordance with a program stored in the storage section 12. The storage section 12 comprises a memory element, such as RAM or ROM, and/or a disk device. The program to be executed by the control section 11 is stored in this storage section 12. The storage section 12 also operates as working memory for the control section 11. In the present embodiment, details of processing to be performed by the control section 11 will be described later.

The operation section 13 is a keyboard, a mouse, or the like, and outputs contents of command operation to the control section 11 upon receipt of the command operation entered by the user. The display section 14 is a display or the like, and displays information in accordance with a command from the control section 11.

The image-capturing section 15 is a digital still camera, a video camera, or the like, and outputs to the control section 11 the image data that have been obtained by means of photographing an image. The image-capturing section 15 is not always required. When the image-capturing section 15 is not provided, image data, which are an object to be processed in the present embodiment, may have been stored in advance in the storage section 12 or received from another device by way of a network.

The following descriptions are provided by means of taking, by way of example, processing which is executed by the image processing apparatus 10 when a face area, including the face of a person, is extracted from image data generated as a result of photographing of a person, and hand areas, including hands of the person, are detected in accordance with information about colors of pixels included in the face area. The embodiment of the present invention is not limited to the previously-described example, and can also be applied to a case where an image area, which includes at least a portion of an arbitrary object, is detected from image data on the basis of information about the nature of the object. For instance, the present invention can be applied to a variety of objects, such as animals, a robot, or the like, whose posture or state can be detected using characteristic information about the appearance of the object, as well as to a person. In this case, depending on the appearance of an object or the format of data pertaining to an image to be captured, information about another characteristic of appearance, such as information about the density of pixels, may be employed in place of color information.

Figure 2:
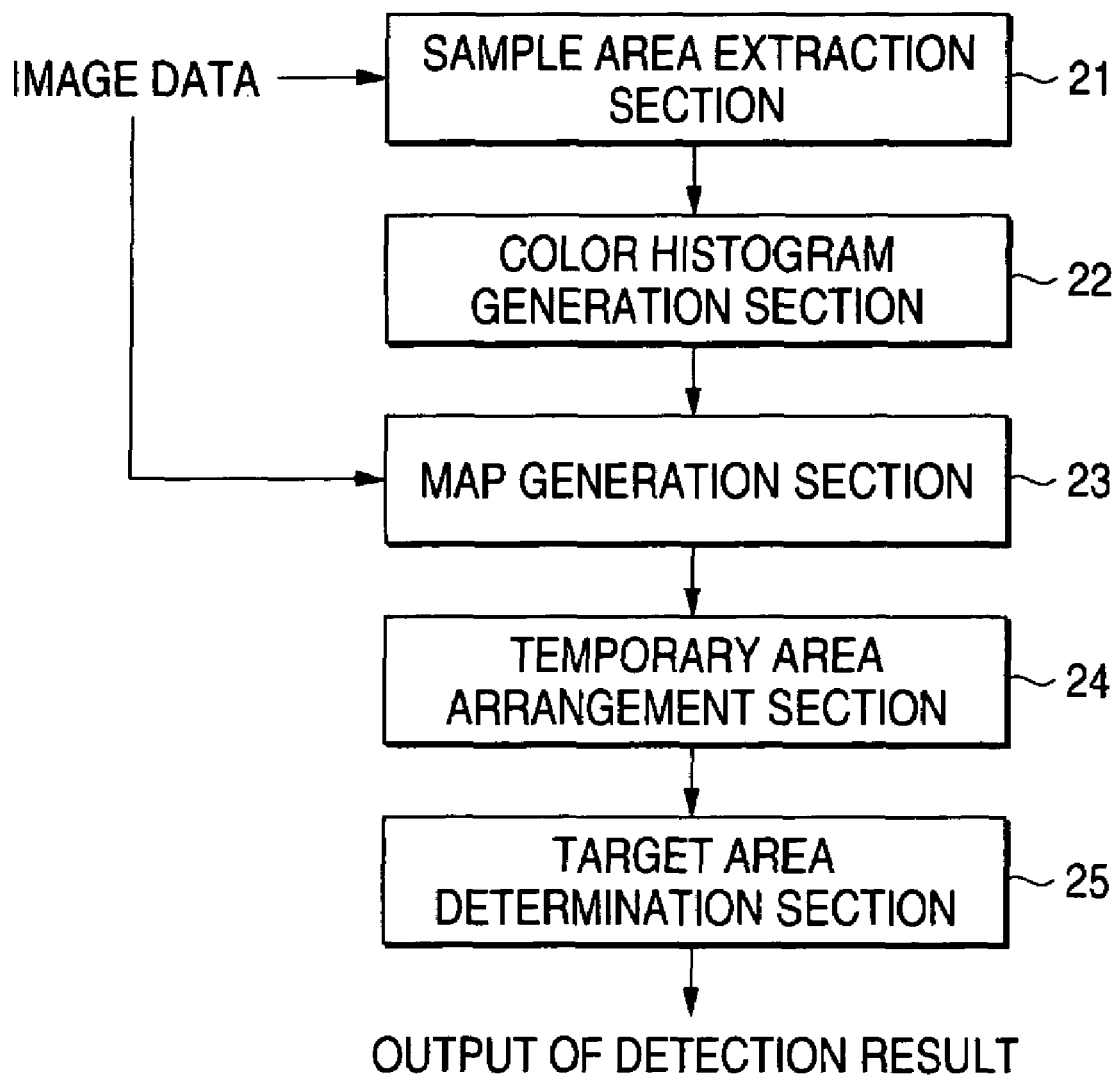
FIG. 2 is a functional block diagram showing the function of the image processing apparatus according to the embodiment of the present invention.

As shown in FIG. 2, the image processing apparatus 10 functionally includes a sample area extraction section 21, a color histogram generation section 22, a map generation section 23, a temporary area arrangement section 24, and a target area determination section 25. Functions of these sections may be stored as a program in the storage section 12 of the image processing apparatus 10, and are executed by the control section 11.

The sample area extraction section 21 extracts an image area, which is to be used as sample data, from image data acquired by the image-capturing section 15. When the image-capturing section 15 is a video camera or the like, motion-picture data are obtained. In this case, the sample area extraction section 21 performs processing on still image data of frames, which are included in motion-picture data.

Here, the sample area extraction section 21 extracts an area (a face area) including the neighborhood of the human face. No particular limitations are imposed on the method for extracting the face area, and an arbitrary technique can be used. For example, the sample area extraction section 21 may extract a face area by use of statistical data pertaining to a shape pattern of the face acquired in advance by learning. The sample area extraction section 21 may also specify the orientation or size of the face as well as the position of the face.

The color histogram generation section 22 generates a color histogram that shows a color distribution of pixels included in the image area extracted by the sample area extraction section 21. The thus-generated color histogram shows skin color information unique to a person, which has been acquired from information about the color of a human face appearing in the image data.

Specifically, the color histogram generation section 22 first converts color values of pixels included in a face area into values in an appropriate color space, as required. For instance, each of pixels included in original image data is assumed to have 256 halftone values from 0 to 255 in relation to the respective three primary colors; namely, red, green, and blue (hereinafter represented as R, G, and B, respectively); and the color of each pixel is represented by a combination of these three values. In this case, the color histogram generation section 22 may generate a three-dimensional histogram by means of using R, G, and B values just as they are without converting color values into values in another color space. Alternatively, the color histogram generation section 22 may use only portions of the three values, to thus generate a lower-dimensional histogram. In particular, when the feature of the skin color of a person is captured, converting the color expressed by values of R, G, and B into values in a normalized "rg" space or values in an HSV space is often used. In the present embodiment, the color is assumed to be converted into values in the normalized "rg" space. An "r" component and a "g" component in the same are computed by the following formulae.

$$r = R/(R+G+B)$$

$$g = G/(R+G+B)$$

By means of these formulae, the color histogram generation section 22 determines values (r, g) in the normalized "rg" space from values (R, G, B) in relation to each pixel, where each of "r" and "g" assumes any value from 0 to 1.

The color histogram generation section 22 determines, in relation to the respective pixels included in the face area, which one of bins in the color histogram includes the values in the color space converted as required. A previously-determined appropriate value is used for the number of bins in the histogram. For instance, on the assumption that the number of bins is 50 for each of the "r" and "g" components, a generated color histogram assumes the form of a two-dimensional histogram having 50×50 bins. Each of "r" and "g" assumes any number from 0 to 1. Hence, when the width of the bin is constant, the width of the bin assumes a value of one-fiftieth.

As mentioned above, the color histogram generation section 22 generates a color distribution in a predetermined color space as a color histogram in relation to the pixels included in the image area extracted by the sample area extraction section 21. The color histogram has, as a frequency for each bin, the number of pixels, which have the color of a component corresponding to each bin. Alternatively, a value, which is determined by dividing the number of pixels having the color of a component corresponding to each bin by the number of pixels to be surveyed, may also be taken as a frequency. In this case, the frequency of each bin is expressed as a ratio of the number of pixels, which have the color of a component corresponding to each bin, to the total number of pixels included in the image area. A total of frequencies of all bins becomes one.

The map generation section 23 generates a map of scores (hereinafter called a "score map") (an activation map) using data of the color histogram generated by the color histogram generation section 22. The score map corresponds to data in which, in relation to each of the pixels included in image data to be processed, positional information about each pixel in the image data is associated with a score pertaining to a degree —to which each pixel is likely to be contained in the hand area to be detected. The score is a value, which is determined by means of computing the degree to which each of the pixels included in the image data is likely to be contained in the target area (the hand area in the present embodiment) by a predetermined method. For instance, a score may be computed on the basis of a likelihood representing a probability of the pixel being included in the hand area. In the present embodiment, the score is computed chiefly on the basis of information about probability that the color of the pixel is the skin color of the person captured in the image data.

A method, such as a back projection method or a correlation method, may be used as a method for computing a score. Specifically, computation of scores is performed as follows. First, the values of colors of pixels, for which scores are computed, are converted into values in the color space used by the color histogram generation section 22, as required. In the color histogram generated by the color histogram generation section 22, the frequency of the bin corresponding to the color information of the converted pixels are set as a score of the skin color of the pixel.

The image area (face area) extracted by the sample area extraction section 21 is excluded from an object for which the target area determination section 25 detects an target area, and hence computation of scores may not be performed. In this case, such image area may be excluded from the object that the target area determination section 25 detects, by means of setting the scores of the pixels included in the image area to zero.

In computing scores, a positional relationship between the target area and the face area may be taken into consideration. That is, even when a pixel located at a position—which is considered to have a high probability of presence of the hand from the position and size of the face area and information about the orientation of the face—has color information of the same skin color as another pixel located at a position which is considered to have a low probability of presence of the hand, scores are computed such that the score of the pixel is higher than the score of the another pixel. As a result, the hand area can be detected with higher accuracy.

In the thus-obtained score map, a pixel having a color closer to the color information of the face area extracted by the sample area extraction section 21 has a higher score. Therefore, pixels having higher scores concentrate in the area including portions related to the skin of the person who is the object of detection.

The temporary area arrangement section 24 arranges a temporary area on the score map generated by the map generation section 23. The temporary area is an area, which is tentatively set on the score map at the time of detecting the hand area, and is imparted with a predetermined shape and size. In the initial state, the temporary area is assumed to be a square, each side having a value of 3 units, each unit corresponding to the size of one pixel. The square is parallel to the vertical and horizontal axes of the score map.

The temporary area arrangement section 24 determines the position where the temporary area is to be arranged, on the basis of a predetermined condition. In this case, a plurality of locations, where the temporary area is to be arranged, may be determined. A method for determining the location of a temporary area on the basis of scores of respective pixels on a score map is available as the method for determining the position where the temporary area is to be located. For instance, a predetermined number of locations (pixels) are selected among all the pixels in descending sequence of score value from higher to lower and determined as centroids of the temporary areas.

The position where the temporary area is arranged may be determined by, e.g., the following method. Specifically, the square area whose size is determined by the predetermined method is prepared, and the entire score map is scanned with the square area. A position where a mean value of the scores of the pixels included in the square area becomes highest is determined. The position of the temporary area is determined such that the centroid of the square area in that position comes to the center of the temporary area. In this case, the maximum size of the square area is determined on the basis of the size of the face area extracted by the sample area extraction section 21. For instance, the size of the square area may be set so as to be 0.4 times the size of the face area. In addition, the position of the temporary area may be determined not only as the position where the mean value of scores is maximum but also in a predetermined number of positions in descending sequence of a mean score from higher to lower. As a result, when compared with a case where the position of the temporary area is determined simply on the basis of the pixels having higher scores, the influence of noise from pixels, which have high scores in spite of not being located in the hand area, can be diminished.

In a case where the original image data are image data of a frame included in a motion picture, so long as the image data of the frame—which is earlier in time than the frame—have already been subjected to detection of a hand area, a position where a temporary area is to be set may be determined on the basis of the position of the hand area obtained by the previous frame. In the case of a motion picture, there is little possibility of occurrence of an abrupt change in the position of the hand area in frame images before and after the current frame image. For this reason, according to this method, the temporary area can be provided in a position, which is highly probable to be the hand area.

The target area determination section 25 repeats computing the scores with changing the position, inclination, and shape of the temporary area on the score map generated by the map generation section 23 while taking the temporary area, which is set on the score map by the temporary area arrangement section 24, as a base point, to thereby detect an area, which is a candidate for an image area (a target area) to be detected. When the temporary area arrangement section 24 has determined a plurality of positions as a location where the temporary area is to be arranged, the target area determination section 25 performs processing of detecting a candidate area with respect to each of the plurality of positions. Of the finally-obtained one candidate area or two candidate areas per one person, the candidate area satisfying predetermined requirements is determined as an target area ("the hand area" in the present embodiment). In this case, when no candidate area satisfying the predetermined conditions is found, the original image data may be determined not to include the hand area. When the number of hand areas included in image data has been known in advance, a predetermined number of candidate areas are determined as hand areas, on the basis of scores of pixels included in the candidate area.

The target area determination section 25 specifies an area where the pixels having high scores concentrate, from the score map, to thus detect a candidate area. Procedures according to which the target area determination section 25 detects a candidate area will be described hereinbelow by reference to a flowchart of FIG. 3. As in the case of an embodiment shown in FIG. 4, coordinates of a center position in the temporary area in the score map, in which the size of one pixel is taken as a unit, are expressed as (x, y); a length parallel to one side of the temporary area in a predetermined direction (direction "w") is expressed as "w"; and a length in a direction (direction "h") orthogonal to the direction "w" is expressed as "h." Moreover, an angle made between the direction "w" and the vertical direction of the score map is expressed as θ. Before the target area determination section 25 starts processing, the coordinates (x, y) correspond to the position determined by the temporary area arrangement section 24. The temporary area assumes a square shape, each side of which has a size of 3. Therefore, "w" and "h" correspond to 3, and θ denotes 0.

The target area determination section 25 initializes the value of a counter "s" as 0 (S1). The counter "s" is a variable used for managing the number of times processing pertaining to S2 to S10 is repeated, when processing is repeated until all the factors of the temporary area; namely, the position, inclination, and shape of the temporary area, converge on one temporary area arranged by the temporary area arrangement section 24. Next, the target area determination section 25 initializes the value of the counter "t" as 0 (S2). A counter "t" is a variable used for managing the number of times processing pertaining to S3 to S6 is repeated, when processing is repeated until the position of the temporary area converges on another position with the inclination and shape of the temporary area being fixed.

Next, the target area determination section 25 computes moments of the current temporary area on the basis of the distribution of scores of the pixels included in the temporary area (S3).

The moments computed in S3 include the $0^{th}$ moment $m_{00}$, the first moments $m_{10}$, $m_{01}$, and the second moments $m_{20}$, $m_{02}$, and $m_{11}$. Reference symbol "i" designates horizontal coordinates of a pixel, which is a unit, on the score map; and "j" designates vertical coordinates of the pixel (see FIG. 4). On the assumption that the score associated with h(i, j) denotes a score for a pixel at the coordinates (i, j), values of moments are computed by the following mathematical equations.

$$m_{00} = \sum_i \sum_j h(i, j)$$

$$m_{10} = \sum_i \sum_j ih(i, j)$$

$$m_{01} = \sum_i \sum_j jh(i, j)$$

$$m_{20} = \sum_i \sum_j i^2 h(i, j)$$

$$m_{02} = \sum_i \sum_j j^2 h(i, j)$$

$$m_{11} = \sum_i \sum_j ijh(i, j)$$

Computation is carried out in relation to the pixels (i, j) included in the temporary area. Specifically, each moment is computed as the sum of functional values including the score h(i, j) and i, j in relation to all the pixels included in the temporary area.

Next, the target area determination section 25 computes the centroid of the scores in the temporary area on the basis of the $0^{th}$ and first moments computed in S3, and the position of the temporary area is changed such that the computed centroid comes to its center (S4). Specifically, given that the centroid of the scores in the temporary area, which is employed for $t^{th}$ repeated processing, is taken as $G^t$ and that the coordinates of $G^t$ are expressed as $(x^t, y^t)$, the centroid of the scores in the temporary area is computed by the following formulae.

$$x^t = m_{10}/m_{00}$$

$$y^t = m_{01}/m_{00}$$

The position of the temporary area is changed such that the computed coordinates of the centroid come to the new center of the temporary area.

Subsequently, the target area determination section 25 adds one to the value of the counter "t" (S5), to thus determine whether or not the predetermined conditions for convergence have been fulfilled (S6). First, if t<2, the processing of changing the position of the temporary area by determining the centroid has been performed once thus far. Accordingly, processing immediately returns to S3, where moments of a newly-set position of the temporary area are computed. In a case other than that, a determination is made as to whether or not the position of the temporary area converges, depending on how far the center of the new temporary area computed in S4 is separated from the center of the previous temporary area before modifications are made in S4. When the distance between $G^{t-1}$ (the centroid of the scores in the temporary area computed in S4) and $G^{t-2}$ (the centroid of scores in the temporary area computed through preceding repeated processing; namely, the center of the temporary area used when the centroid of the scores is computed in S4) is less than a predetermined threshold value, the position of the temporary area is determined to have converged on $G^{t-1}$, and the repeated processing is terminated, whereby processing proceeds to the subsequent processing pertaining to S7. When the value of the counter "t" has exceeded the predetermined value; namely, when the number of repetitions has reached a given count, repeated processing is terminated, and processing proceeds to subsequent processing pertaining to S7. The reason for this is to avoid consumption of very much time before the position of the temporary area finally converges, or to avoid a failure to end repeated processing due to the position of the temporary area failing to converge. In a case where these conditions are not fulfilled; namely, when the number of repetitions has not yet reached a predetermined count and when a distance between $G^{t-1}$ and $G^{t-2}$ has not fallen out of the predetermined threshold value, processing returns to S3, where repeated processing is continued. When the center position of the temporary area has converged on the position of centroid of the scores, the center of the temporary area and the centroid of the scores in the temporary area are considered to essentially coincide with each other.

Subsequently, the target area determination section 25 rotates the temporary area over the score map by means of changing the inclination of the temporary area with the value of the angle determined by a predetermined function (S7). The inclination θ of the temporary area with respect to the score map can be computed on the basis of the $0^{th}$ and second moments computed in S3 by means of the following formula.

$$\theta = \frac{1}{2}\arctan\left[\frac{2.0\left(\frac{m_{11}}{m_{00}} - xy\right)}{\left(\frac{m_{20}}{m_{00}} - x^2\right) - \left(\frac{m_{02}}{m_{00}} - y^2\right)}\right]$$

Here, the "x" and "y" denote the center of the current temporary area and correspond to the coordinates of the centroid of the scores computed in S4 in relation to the temporary area achieved when the moments are computed in S3.

The target area determination section 25 computes a new value of "w" and a new value of "h" on the basis of the scores of the pixels included in the current temporary area and the scores of the pixels included in an area surrounding the current temporary area. Thereby, the ratio of the length of the temporary area in direction "w" to the length of the same in direction "h" is changed (S8).

In this case, a size of the temporary area in an axial direction is changed on the basis of scores of the pixels included in an area in the axial direction (direction "w" in the present embodiment), which is set with respect to the temporary area among the areas surrounding the temporary area. On the basis of the scores of the pixels included in the area located in a direction (direction "h" in the present embodiment) orthogonal to the axial direction, the size of the temporary area in the orthogonal direction is changed. As mentioned above, there is repeated the processing of changing the size of the temporary area in the axial direction fixed to the temporary area and the direction orthogonal to the axial direction, on the basis of information of the scores of the surrounding areas along the respective directions. As a result, even when the area to be detected assumes an elongated shape, the shape of the temporary area can be changed to a desirable shape by means of a smaller number of repetitions. Consequently, the shape of the temporary area quickly converges on the desired shape, so that a processing time can be shortened.

Figure 5:
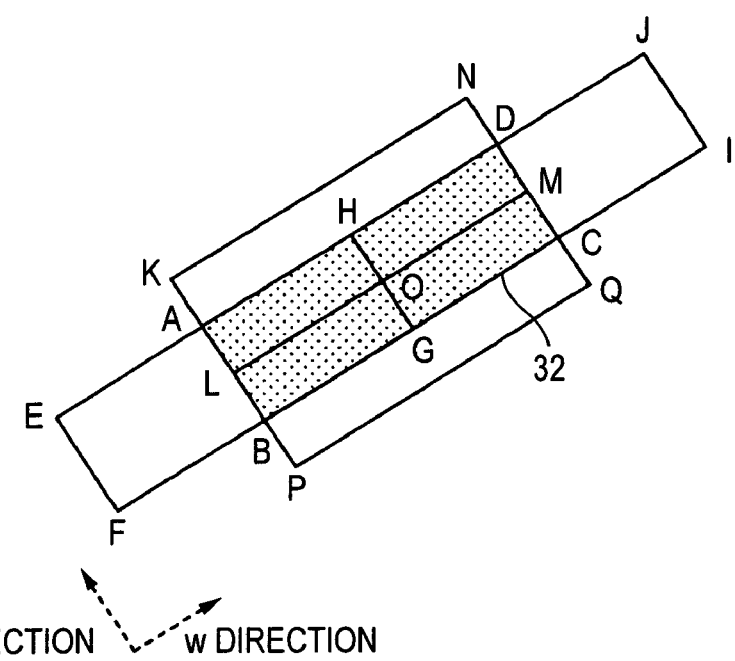
FIG. 5 is a view showing an example area adjacent to a temporary area which is to become an object of processing performed by an target area determination section 25.

Specifically, the total of scores of the pixels included in a plurality of respective areas (the $0^{th}$ moment in the respective areas) belonging to a predetermined area surrounding the temporary area is computed, and the value of "w" and that of "h" are computed on the basis of the $0^{th}$ moments. For instance, as shown in FIG. 5, the target area determination section 25 computes the $0^{th}$ moments in relation to the temporary area and areas to which the temporary area has been shifted in parallel in respective directions +w, −w, +h, and −h. A rectangle ABCD represented by a hatched area in FIG. 5 shows the temporary area with a centroid of the scores computed in S4. In the embodiment shown in FIG. 5, the areas for which the target area determination section 25 computes the $0^{th}$ moment has five rectangular areas, which have the same shape as will be described below. More specifically, the five rectangular areas are the rectangle ABCD; a rectangle HGIJ to which the rectangle ABCD has been shifted in parallel in direction +w by the amount of w/2; a rectangle EFGH to which the rectangle ABCD has been shifted in parallel in direction −w by the amount of w/2; a rectangle KLMN to which the rectangle ABCD has been shifted in parallel in direction +h by the amount of h/2; and a rectangle LPQM to which the rectangle ABCD has been shifted in direction −h by the amount of h/2.

Provided that the $0^{th}$ moments of the five rectangles are $M_1$, $M_2$, $M_3$, $M_4$, and $M_5$, a value $w^s$ representing the size of a new temporary area in direction "w" and a value $h^s$ representing the size of the new temporary area in direction "h" can be computed by the following formula using the size $w^{s-1}$ of the current temporary area in direction "w" and the size $h^{s-1}$ of the current temporary area in direction "h."

$$w^s = w^{s-1} + \Delta w \frac{M_2 + M_3 - M_1}{M_1}$$

$$h^s = h^{s-1} + \Delta h \frac{M_4 + M_5 - M_1}{M_1}$$

Δw and Δh denote predetermined coefficients, and the predetermined coefficients are set as, e.g., Δw=Δh=2.0.

According to these formulae, the size of the temporary area in direction "w" is changed based on the scores of the pixels in the areas adjacent to the temporary area in directions ±w; and the size of the temporary area in direction "h" is changed based on the scores of the pixels in areas adjacent to the temporary area in directions ±h. The amount of change in "w" and the amount of change in "h" are independently computed on the basis of the information about scores of the adjacent areas in directions "w" and "h."

Figure 6:
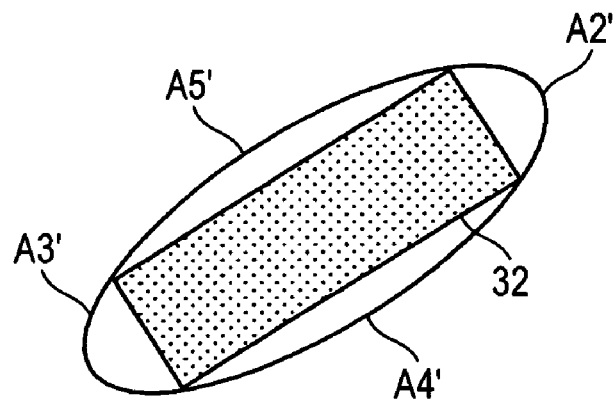
FIG. 6 is a view showing another example area adjacent to the temporary area which is to become an object of processing performed by the target area determination section 25.

Processing pertaining to S8 may be performed using an area different from that described above as an adjacent area. For instance, "w" and "h" may be computed from scores of pixels included in an oval circumscribing the temporary area such as that shown in FIG. 6. In this case, on the assumption that the axial length of the circumscribing oval is defined as $\sqrt{2}w, \sqrt{2}h,$ dimensions of areas A2', A3', A4', and A5' sandwiched between the oval and temporary area assume $(\pi-2)wh/8$ and become equal to each other. Provided that the $0^{th}$ moments of these areas are $M_2'$, $M_3'$, $M_4'$, and $M_5'$, new values of "w" and "h" can be obtained using the area of the oval, by means of replacing $M_2$, $M_3$, $M_4$, and $M_5$ provided in the above embodiment with $M_2'$, $M_3'$, $M_4'$, and $M_5'$. The areas A2', A3', A4', A5' are different in dimension from the temporary area. In order to eliminate the influence of this difference, there may be used a mean value of the scores, which has been determined by dividing the $0^{th}$ moments by the respective areas; i.e., the number of pixels included in the respective areas.

Figure 7:
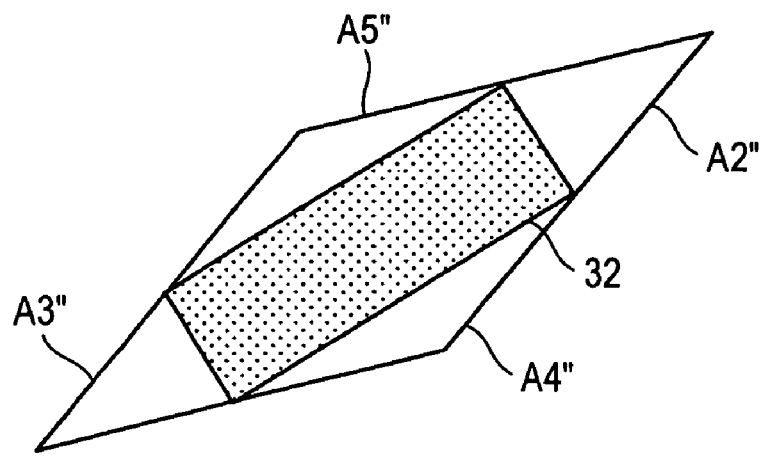
FIG. 7 is a view showing another example area adjacent to the temporary area which is to become an object of processing performed by the target area determination section 25.

For instance, as shown in FIG. 7, in place of the oval area, a rhombic area circumscribing the temporary area may also be employed. In this case, on the assumption that diagonal lines of the circumscribing rhombic area are taken as 2w, 2h, dimensions of areas A2", A3", A4", and A5", which are sandwiched between the rhombic area and the temporary area, assume wh/4 and become equal to each other. The $0^{th}$ moments of these areas are assumed to be $M_2"$, $M_3"$, $M_4"$, and $M_5"$, and $M_2'$, $M_3'$, $M_4'$, and $M_5'$, which are described in connection with above-described embodiment, are replaced with $M_2"$, $M_3"$, $M_4"$, and $M_5"$, so that a new value of "w" and a new value of "h" can be obtained using the rhombic area.

When the previously-described oval or rhombic area is used, "w" and "h" may be changed on the basis of an area included in the oval or rhombus containing the temporary area rather than on the basis of the oval or rhombus circumscribing the temporary area. In this case, the area included in the oval or rhombus is divided into an area in direction ±w and an area in direction ±h with respect to the temporary area, by means of a predetermined method, and the $0^{th}$ moment of each of the thus-divided areas is computed. The divided areas may be different from each other in terms of an area. In that case, the $0^{th}$ moment of each area is divided by the dimension of that area; that is, the number of pixels included in that area, to thus compute a mean score. By use of the mean score, "w" and "h" are computed.

Subsequently, the target area determination section 25 adds one to the value of the counter "s" (S9), to thus determine whether or not the predetermined conditions for convergence have been fulfilled (S10). Specifically, when s<2 is achieved, processing for changing the inclination, width, and height of the temporary area has been performed only once thus far. Hence, processing immediately returns to S2, to thus perform processing for initializing "t" and again computing moments from the newly-set inclination, width, and height of the temporary area. In other cases, on the basis of the result of a determination as to whether or not the inclination θ of the new temporary area computed in S7 and the width "w" and height "h" of the new temporary area coincide with the inclination, width, and height of the temporary area as before changed, a determination is made as to whether or not the inclination and shape of the temporary area have converged to θ, "w," and "h." If all the factors θ, "w," and "h" remain unchanged even when subjected to processing pertaining to S7 and S8 or when the amounts of changes in the factors are less than a predetermined threshold value, the inclination and shape of the temporary area are determined to have converged on the current factors θ, "w," and "h." Repeated processing is terminated, and processing then proceeds to subsequent processing pertaining to S11. When the value of the counter "s" has exceeded the predetermined value; namely, when the number of repetitions has reached a given count, repeated processing is terminated, and processing proceeds to S10. The reason for this is to avoid consumption of a great amount of time before the inclination and shape of the temporary area finally converge or to avoid failure of repeated processing to end due to failure of the position of the temporary area to converge. In a case where these conditions are not fulfilled; namely, when the number of repetitions has not yet reached a predetermined count and when the amount of change in any of θ, "w, " and "h" has fallen short of a predetermined threshold value, processing returns to S2, where repeated processing is continued.

When the inclination and shape of the temporary area have converged on all the factors θ, "w," and "h," the current temporary area is determined as an area candidate for the target area (S11). Specifically, "x" and "y" representing the position of the current temporary area on the score map, θ representing the inclination of the current temporary area on the score map, "w" representing the size of the current temporary area in direction "w," and "h" representing the size of the current temporary area in direction "h" are set as parameters for the candidate area.

When the candidate areas have been acquired through the above-described processing, an area fulfilling the predetermined conditions is selected from the candidate areas, and the thus-selected candidate area is determined as the target area (the hand area in the present embodiment), as mentioned previously. Information of the thus-determined hand area is recorded in the storage section 12 as information pertaining to the posture and state of the person, or is used for other processing. When the image data used as an object of processing are data pertaining to a frame image which is a portion of a motion picture, a hand area is detected from each of frames of the motion picture data, and information about a difference between the hand areas of the respective frames is acquired, to thus be enable ascertainment of the motion of the person's hand.

According to the present embodiment, a skin portion of the arm is exposed, and hence an arm area including an arm portion is obtained as an target area from the image data obtained by photographing a person wearing, e.g., short sleeves. In this case, a portion of the thus-obtained arm area, or an area adjacent to the arm area, can be determined as a hand area in accordance with predetermined conditions. For instance, when the area including an arm is detected as a rectangular area, either longitudinal end of the rectangle is considered to possibly be close to an area including a hand portion. Therefore, the hand area can be defined by use of the position, shape, and inclination of the arm area, a relative relationship between the arm and the position of the face, and information about the color of an area surrounding the arm area.

According to the embodiment of the present invention described above, areas having different aspect ratios can be detected as areas of interest by changing "w" and "h" on the basis of scores of areas adjacent to the temporary area. As a result, even when an area, whose shape on image data greatly changes according to a positional relationship with respect to a camera such as an area including an arm, is detected, detection accuracy can be enhanced.

The above descriptions have stated an example where scores are set for respective pixels included in image data, to thus generate a score map. However, the score map to be generated by the map generation section 23 does not necessarily employ pixels as unit areas. A plurality of pixels; e.g., 2×2=4 pixels, may be set as a unit area, and a score is set for each unit area. Thus, a score map, which has a more coarse volume of information than the volume of information achieved in a case where a score is set on a per-pixel basis, is obtained. As a result of the temporary area arrangement section 24 and the target area determination section 25 detecting a hand area by use of this score map, the hand area can be detected with involvement of a smaller amount of computation, although with reduced accuracy of detection of the hand area.

In the above description, the sample area extraction section 21 first extracts a face area, and the color histogram generation section 22 generates a color histogram from pixels included in the thus-acquired face area. However, the present invention is not limited to the embodiment. Specifically, the color histogram may be given in advance as a color distribution of predetermined skin color, or study data acquired through processing of the past for detecting the hand area may also be used. When a hand area is detected from image data pertaining to frames included in a motion picture, a score map may be generated through use of the color histogram that has been generated by the color histogram generation section 22 from the image data of previous frames.

When the present invention is used for detecting a hand area, the hand area can be extracted without regard to the clothing (e.g., short sleeves or long sleeves) worn by the person. Moreover, the image data pertaining to the detected hand area are combined with extraction of a finger area effective for ascertaining a gesture. As a result, more effective application of the present invention becomes practicable.

Figure 3:
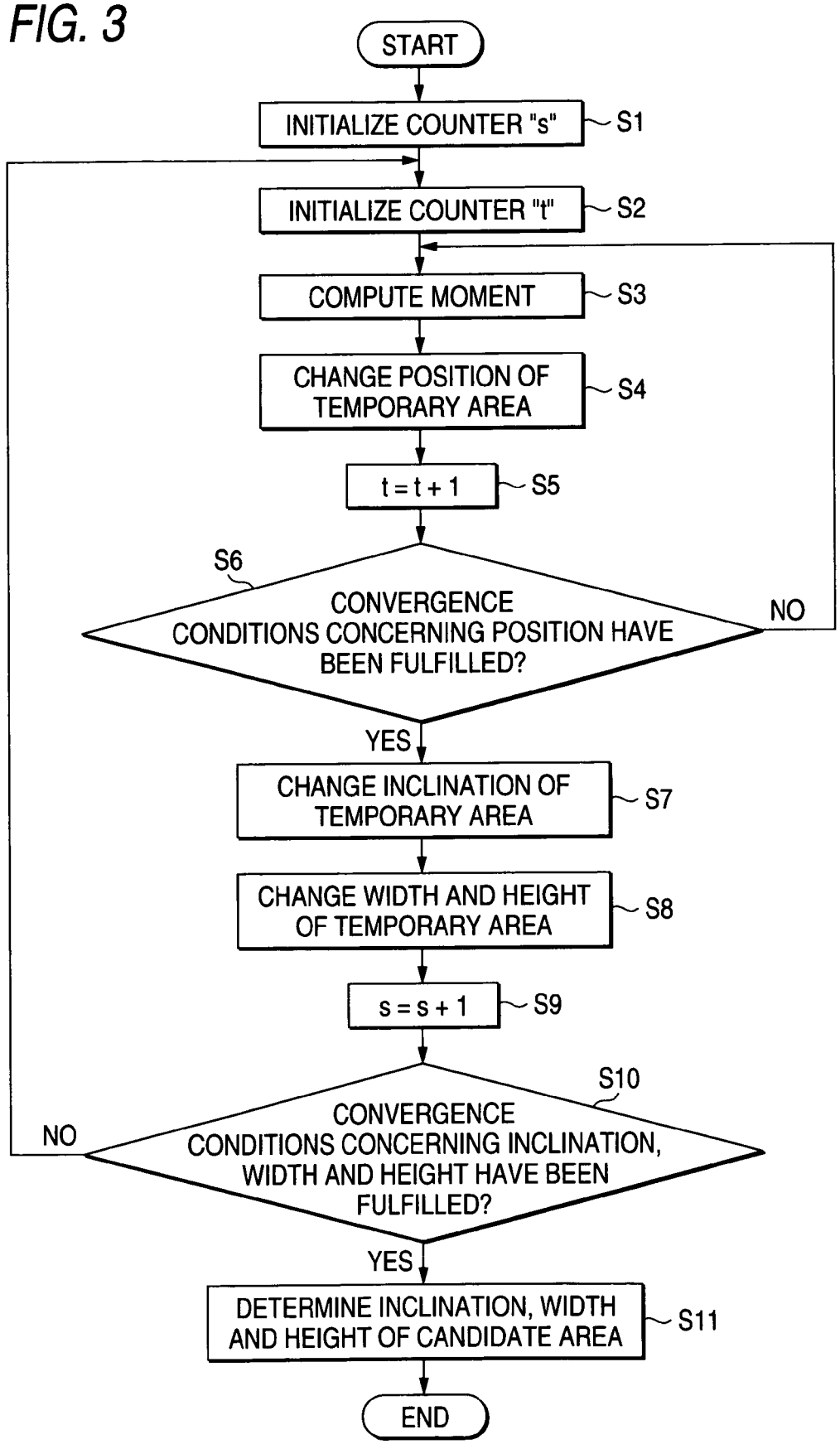
FIG. 3 is a flowchart showing example processing to be performed by the image processing apparatus according to the embodiment of the present invention.
Figure 4:
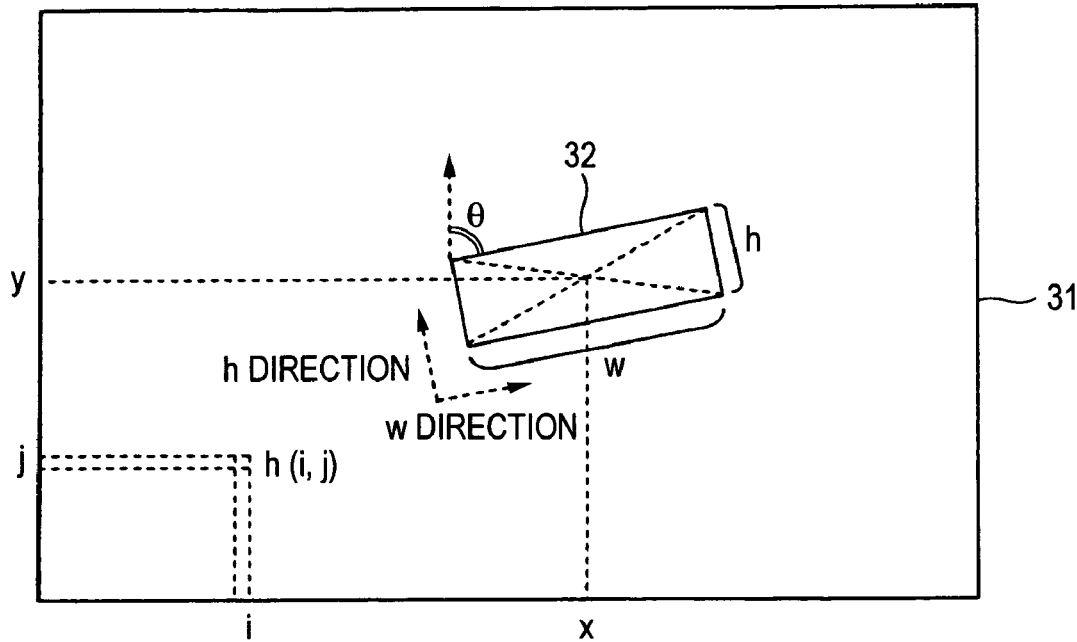
FIG. 4 is a view showing an example map of scores generated by the image processing apparatus of the present embodiment.

FIG. 1
10 Image Processing Apparatus
11 Control Section
12 Storage Section
13 Operation Section
14 Display Section
15 Image Capturing Section
FIG. 2
21 Sample Area Extraction Section
22 Color Histogram Generation Section
23 Map Generation Section
24 Temporary Area Arrangement Section
25 Target Area Determination Section
FIG. 3
S1 Initialize Counter "s"
S2 Initialize Counter "t"
S3 Compute Moment
S4 Change Position of Temporary Area
S6 Have Convergence Conditions Concerning Position Been Fulfilled
S7 Change Inclination of Temporary Area
S8 Change Width and Height of Temporary Area
S10 Have Convergence Conditions Concerning Inclination, Width, and Height Been Fulfilled?
S11 Determine Inclination, Width, and Height of Candidate Area

What is claimed is:

1. An image processing apparatus for detecting a target area including at least a portion of an object from image data generated by capturing at least the portion of the object, the apparatus comprising:

a map generation unit that acquires a map of scores in which each score pertaining to a degree—to which a corresponding unit area of the image data is likely to be contained in the target area—is associated with a position of the corresponding unit area in the image data;

a temporary area arrangement unit that arranges a temporary area of a predetermined shape in a position on the map of scores, the position being determined in accordance with a predetermined condition; and a target area detection unit that performs, at least once, at least one of:

(1) processing of changing the position of the temporary area on the map of scores, on a basis of a distribution of scores of unit areas included in the temporary area, and (2) processing of changing a ratio of a length of the temporary area in a predetermined direction to a length of the temporary area in a direction orthogonal to the predetermined direction, on a basis of positions and scores of unit areas included in a predetermined adjacent area adjacent to the temporary area, the target area determination unit that determines the temporary area as the target area when another predetermined condition is met, the target area determination unit that outputs the determined target area, wherein the temporary area is a rectangular area, and the adjacent area comprises four rectangular areas adjacent to four respective sides of the temporary area.

2. The image processing apparatus according to claim 1, wherein the target area detection unit further performs processing of rotating the temporary area on the map of scores on a basis of the distribution of the scores.

3. The image processing apparatus according to claim 1, wherein the adjacent area is included in an oval or rhombus, which contains or circumscribes the temporary area.

4. The image processing apparatus according to claim 1, wherein the temporary area arrangement unit arranges the temporary area in a position, which is determined on a basis of positions and the scores of the unit areas included in the map of scores.

5. An image processing method for detecting, using a computer, a target area including at least a portion of an object from image data generated by capturing at least the portion of the object, the method comprising:

acquiring a map of scores in which each score pertaining to a degree—to which a corresponding unit area of the image data is likely to be contained in the target area—is associated with a position of the corresponding unit area in the image data;

arranging a temporary area of a predetermined shape in a position on the map of scores, the position being determined in accordance with a predetermined condition;

performing, at least once, at least one of:

(1) processing of changing the position of the temporary area on the map of scores, on a basis of a distribution of scores of unit areas included in the temporary area, and (2) processing of changing a ratio of a length of the temporary area in a predetermined direction to a length of the temporary area in a direction orthogonal to the predetermined direction, on a basis of positions and scores of unit areas included in a predetermined adjacent area adjacent to the temporary area;

determining the temporary area as the target area when another predetermined condition is met; and outputting the determined target area, wherein the temporary area is a rectangular area, and the adjacent area comprises four rectangular areas adjacent to four respective sides of the temporary area.

6. A storage medium readable by a computer, the storage medium storing a image processing program of instructions executable by the computer to perform a function for detecting a target area including at least a portion of an object from image data generated by capturing at least the portion of the object, the function comprising:

acquiring a map of scores in which each score pertaining to a degree—to which a corresponding unit area of the image data is likely to be contained in the target area—is associated with a position of the corresponding unit area in the image data;

arranging a temporary area of a predetermined shape in a position on the map of scores, the position being determined in accordance with a predetermined condition;

performing, at least once, at least one of:

(1) processing of changing the position of the temporary area on the map of scores, on a basis of a distribution of scores of unit areas included in the temporary area, and (2) processing of changing a ratio of a length of the temporary area in a predetermined direction to a length of the temporary area in a direction orthogonal to the predetermined direction, on a basis of positions and scores of unit areas included in a predetermined adjacent area adjacent to the temporary area;

determining the temporary area as the target area when another predetermined condition is met; and outputting the determined target area, wherein the temporary area is a rectangular area, and the adjacent area comprises four rectangular areas adjacent to four respective sides of the temporary area.

7. The image processing apparatus according to claim 1, wherein each rectangular area is determined based on $0^{th}$ moment.

8. The image processing method according to claim 5, wherein each rectangular area is determined based on $0^{th}$ moment.

9. The image processing program according to claim 6, wherein each rectangular area is determined based on $0^{th}$ moment.

* * * * *